(12) United States Patent
Burdock et al.

(10) Patent No.: US 6,471,218 B1
(45) Date of Patent: Oct. 29, 2002

(54) VEHICLE SUSPENSIONS

(75) Inventors: William Burdock, Sutton Coldfield; Adrian Michael Griffiths, Solihull, both of (GB); Jing Shen Tang, Westland, MI (US)

(73) Assignee: Land Rover Group Limited, St. Helier (GB)

( * ) Notice: Subject to any disclaimer, the term of this patent is extended or adjusted under 35 U.S.C. 154(b) by 0 days.

(21) Appl. No.: 09/763,382

(22) PCT Filed: Aug. 10, 1999

(86) PCT No.: PCT/GB99/02638

§ 371 (c)(1),
(2), (4) Date: May 17, 2001

(87) PCT Pub. No.: WO00/10823

PCT Pub. Date: Mar. 2, 2000

(30) Foreign Application Priority Data

Aug. 22, 1998 (GB) .............................................. 9818268

(51) Int. Cl.[7] .......................................... B60G 17/015
(52) U.S. Cl. ................................ 280/5.502; 280/5.506; 280/5.51; 280/755
(58) Field of Search ........................... 280/5.502, 5.503, 280/5.506, 5.508, 5.51, 5.511, 755

(56) References Cited

U.S. PATENT DOCUMENTS

| 4,650,212 A | * | 3/1987 | Yoshimura ............... 280/5.502 |
| 4,821,606 A | | 4/1989 | Leiber |
| 4,903,983 A | | 2/1990 | Fukushima et al. |
| 4,974,875 A | | 12/1990 | Sugasawa et al. |
| 5,029,892 A | | 7/1991 | Miwa |
| 5,033,573 A | | 7/1991 | Hrovat |
| 5,517,414 A | | 5/1996 | Hrovat |
| 5,662,356 A | | 9/1997 | Lund |
| 5,711,024 A | | 1/1998 | Wanke |

FOREIGN PATENT DOCUMENTS

| DE | 38 17 540 A1 | 11/1989 |
| EP | 0 106 697 A1 | 4/1984 |
| EP | 0 364 965 A2 | 4/1990 |
| EP | 0 378 202 A2 | 7/1990 |

* cited by examiner

Primary Examiner—Peter C. English
(74) Attorney, Agent, or Firm—Davis & Bujold, P.L.L.C.

(57) ABSTRACT

In an active roll control system for a vehicle, anti-roll bars (26, 30) are provided with actuators (28, 32) which can provide a torque in the anti-roll bars to control vehicle body roll. Under certain cornering conditions when the vehicle is liable to over-steer, the pressure supply to the actuators is pulsed so that the front wheels of the vehicle tend to break away more easily, thereby reducing over-steer.

18 Claims, 4 Drawing Sheets

VEHICLE SUSPENSIONS

The present invention relates to the use of vehicle suspension systems so as to control the steering characteristics of the vehicle.

BACKGROUND OF THE INVENTION

Under harsh steering conditions many vehicles exhibit a certain degree of either under-steer, where the vehicle does not corner as tightly as the angle of the steered wheels suggests it should, or over-steer, where the vehicle tends to spin round too quickly under cornering. Under-steer is caused by loss of grip between the front, steered, wheels of the vehicle and the ground, which prevents them from steering the front of the vehicle round the corner, and over-steer is caused by loss of grip between the rear wheels and the ground, which allows the rear of the vehicle to swing outwards when cornering. The present invention aims to provide a system in which these problems can be reduced by controlling more accurately the level of traction or grip between the front and rear wheels and the ground during corning.

It is known from U.S. Pat. Nos. 4,974,875 and 4,903,983 to provide a suspension in which the load can be transferred between wheels so as to control the grip of each wheel and hence the cornering characteristics. Another such system is disclosed in DE 38 17 540.

SUMMARY OF THE INVENTION

Accordingly the present invention provides a vehicle suspension system comprising an actuator arranged to produce an actuator force between a sprung part of the vehicle and a part of the suspension which can move relative to said sprung part thereby to allow vertical travel of a wheel, measuring means arranged to measure cornering of the vehicle, and control means, characterized in that the control means is arranged, in the event of predetermined cornering conditions, to promote lateral slipping of the wheel by producing a rapid variation in said actuator force so as to produce a pulsing of the contact force between the wheel and the ground causing a reduction in adhesion of the wheel, so as to control the steering characteristics of the vehicle.

The pulsed variation may be arranged to promote lateral slipping of the front wheels of the vehicle during cornering thereby reducing over-steer. Conversely it could be arranged to promote lateral slipping of the rear wheels of the vehicle during cornering thereby reducing under-steer.

Preferably the measuring means is arranged to measure lateral acceleration of the vehicle, and the control means is arranged to control the actuator force in response to the measured lateral acceleration In one embodiment the control means is arranged to produce a sharp change in actuator force when the measured lateral acceleration reaches a predetermined level such that a change in lateral acceleration of the vehicle produces a pulse in the actuator force. This will induce vertical vibration of the relevant wheel mounted on said suspension system relative to the sprung part of the vehicle at its natural frequency.

In another embodiment the control means is arranged to produce pulsed variations in the actuator force of a controlled frequency in the event of said predetermined cornering conditions. This will produce vibration of the relevant wheel at that controlled frequency.

The present invention can be applied to any form of active suspension. Accordingly the actuator may comprises a strut arranged to produce forces in a vertical direction between a wheel of the vehicle and a sprung part of the vehicle, as in a fully active gas suspension system, for example. Alternatively the actuator may be arranged to urge two wheels of the vehicle in opposite vertical directions, as in an active roll-control system.

BRIEF DESCRIPTION OF THE DRAWINGS

Preferred embodiments of the invention will now be described by way of example only with reference to the accompanying drawings in which.

DESCRIPTION OF THE PREFERRED EMBODIMENTS

Figure 1:
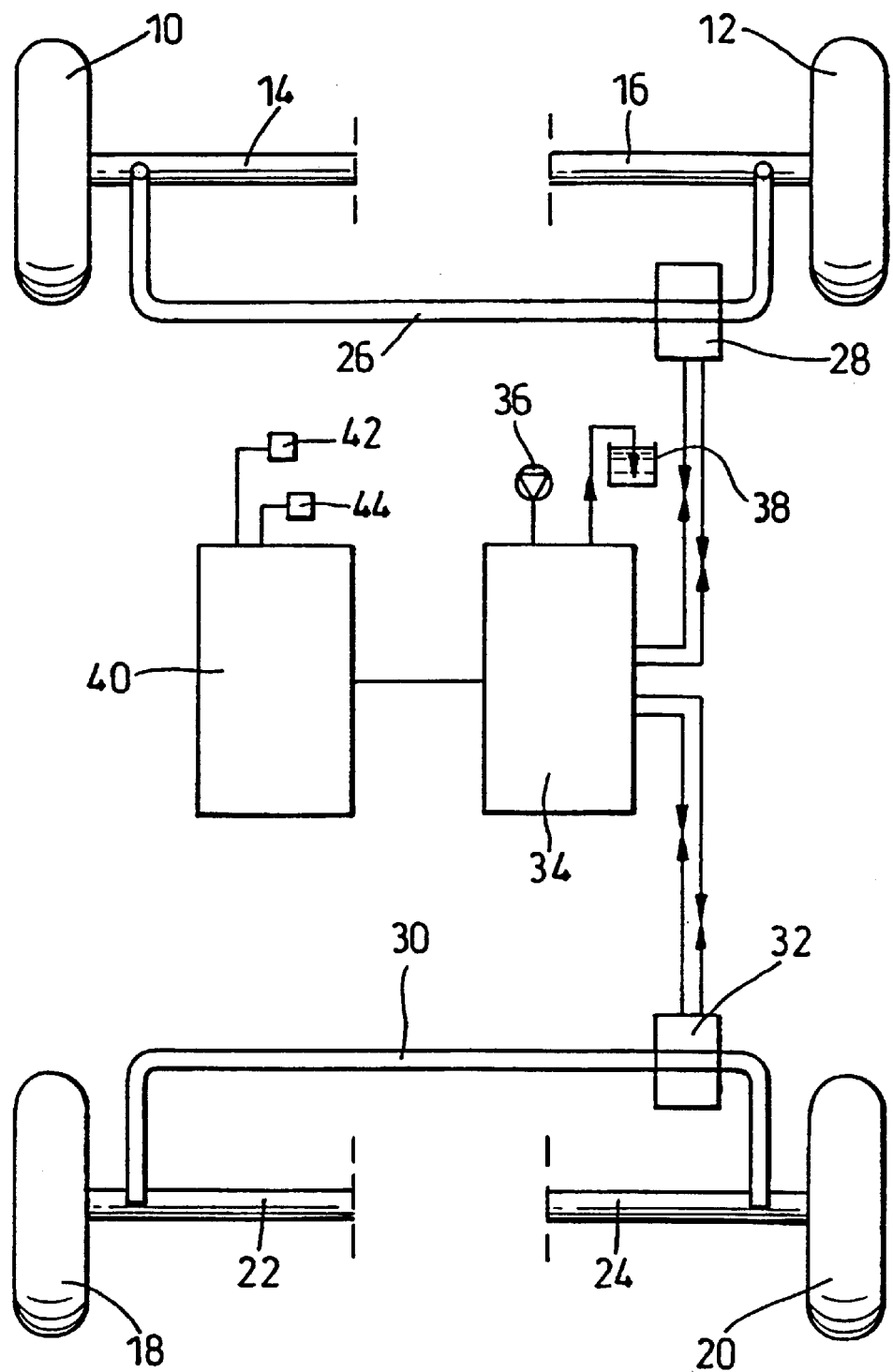
FIG. 1 is a diagrammatic representation of a vehicle including a suspension system according to the invention.

Referring to FIG. 1, a vehicle has two steerable front wheels 10, 12 mounted on suspension arms 14, 16 which are pivotably mounted on the vehicle body at their inner ends to allow vertical movement of the wheels 10, 12 relative to the vehicle body. Two non-steerable rear wheels 18, 20 are similarly mounted on corresponding suspension arms 22, 24 at the rear of the vehicle. The front suspension arms 14, 16 are interconnected by an anti-roll torsion bar 26 which resiliently opposes relative vertical movement of the two front wheels 10, 12. The torsion bar 26 forms part of an assembly including a hydraulic actuator 28 which is only shown schematically and can be operated to apply a torque between the two ends of the torsion bar 26 thereby tending to move the two front wheels 10, 12 in opposite vertical directions relative to the vehicle body. The actuator can take a variety of forms which are known, such as a hydraulic strut acting between the end of the torsion bar and the body, or a torsional actuator in the central lateral part of the torsion bar applying a torque between the two ends. A corresponding anti-roll bar 30 with an associated actuator 32 acts between the rear suspension arms 22, 24 to control articulation of the rear wheels 18, 20.

The actuators 28, 32 are controlled by a hydraulic control valve block 34 which can connect them up in known manner to a hydraulic pump 36 and reservoir 38 so as to apply torque in either direction independently to each anti-roll bar 26, 30.

The valve block 34 is controlled by an electronic control unit 40, which receives signals from a pair of lateral accelerometers 42, 44 mounted on the vehicle body which measure the acceleration of the vehicle body in the lateral direction, i.e. the horizontal direction perpendicular to the normal direction of travel at separate points on the vehicle body.

Figure 2:
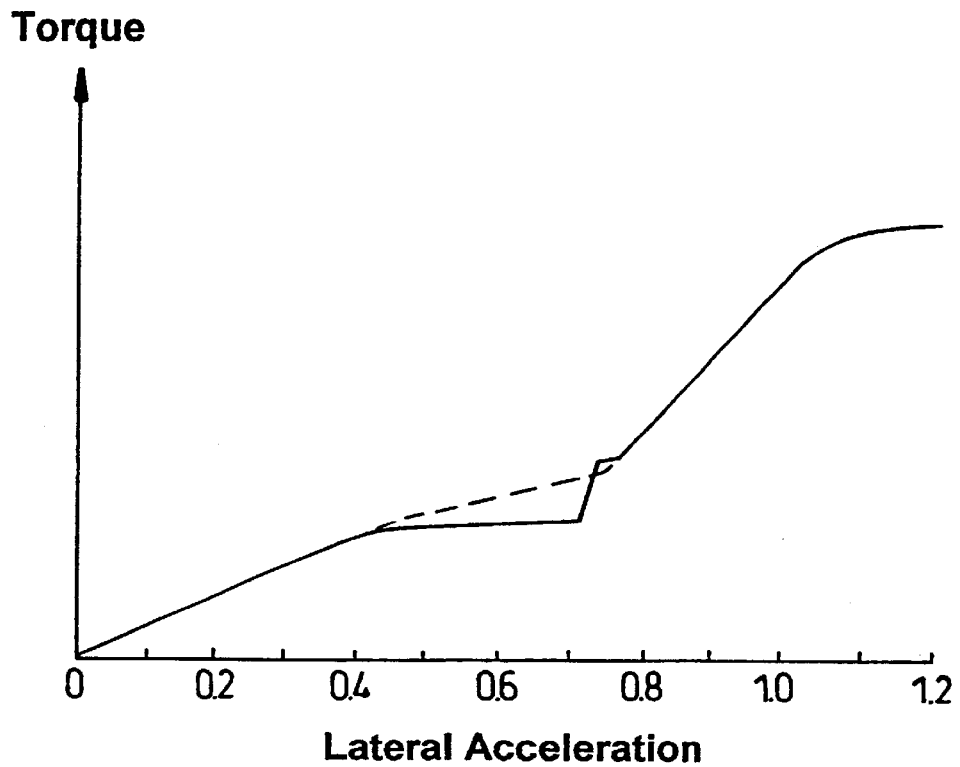
FIG. 2 is a graph showing the relationship between actuator torque and lateral acceleration produced in the system of FIG. 1.

Referring to FIG. 2, in the first embodiment of the invention the control unit 40 is arranged to apply an equal torque to the front and rear anti-roll bar actuators 28, 32 which varies with lateral acceleration of the vehicle as shown by the solid line. As can be seen the applied torque increases steadily with lateral acceleration up to about 0.4 g (where g is normal gravitational acceleration). Between 0.4 and 0.75 g the torque increases more gradually. Then between 0.75 and 0.775 g the torque increases rapidly and then levels off forming a sharp discontinuity or step in the torque/lateral acceleration characteristic. Above 0.775 g the torque increases steadily and then levels off towards the maximum torque available from the system.

For normal roll control the characteristic would be approximately as shown in the broken line in FIG. 2, i.e. a smooth curve, the shape of which would depend on the amount of body roll desired under varying degrees of lateral acceleration. The effect of the step in the characteristic is to reduce over-steer as will now be described.

The vehicle for which this system would be suitable would be one which tends to over-steer when the lateral acceleration produced by cornering exceeds about 0.8 g. In such a vehicle the over-steer is caused by the rear wheels losing grip so that the rear of the vehicle swings outwards on the corner. With the characteristic shown in FIG. 2, when the lateral acceleration reaches 0.7–0.75 g, the sudden change in torque applied to the anti-roll bars sets up a vertical vibration in the wheels at their natural frequency of vibration, which is accommodated by expansion and compression of the tire and produces a cyclical variation in the contact force between the tire and the ground. This vibration tends to cause both the front and rear wheels to break away at the same time. This tends to prevent over-steer, and will generally result in a certain degree of under-steer, which is usually more acceptable.

Figure 3:
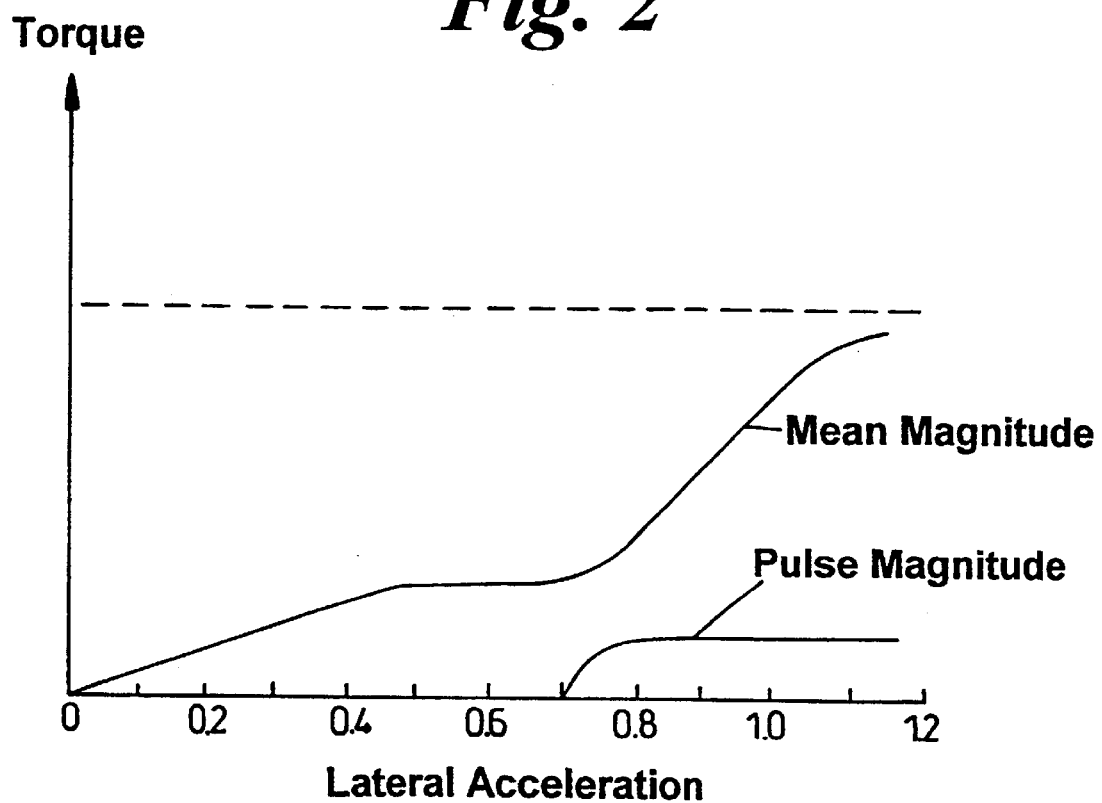
FIG. 3 is a graph corresponding to FIG. 2 for a second embodiment of the invention.

Referring to FIG. 3, a second embodiment of the invention uses the same arrangement as shown in FIG. 1, but with a different torque characteristic for the actuators 28, 32, which is shown in FIG. 3. This characteristic comprises a mean torque component which increases in a generally smooth and continuous manner with lateral acceleration, and a pulsed component superimposed on the mean torque component. The mean torque curve increases steadily at a rate sufficient to keep the vehicle approximately level up to a lateral acceleration of about 0.5 g. It then increases more gradually up to about 0.7 g to allow increasing body roll. Then from about 0.7 g it increases more rapidly again towards the maximum torque available to resist high levels of body roll at high lateral accelerations. The torque pulses in this example are at a frequency of 5 Hz and start at lateral accelerations of 0.7 g. They increase in magnitude up to about 10% of the total torque available and remain at that level for lateral accelerations above 0.775 g.

Figure 4:
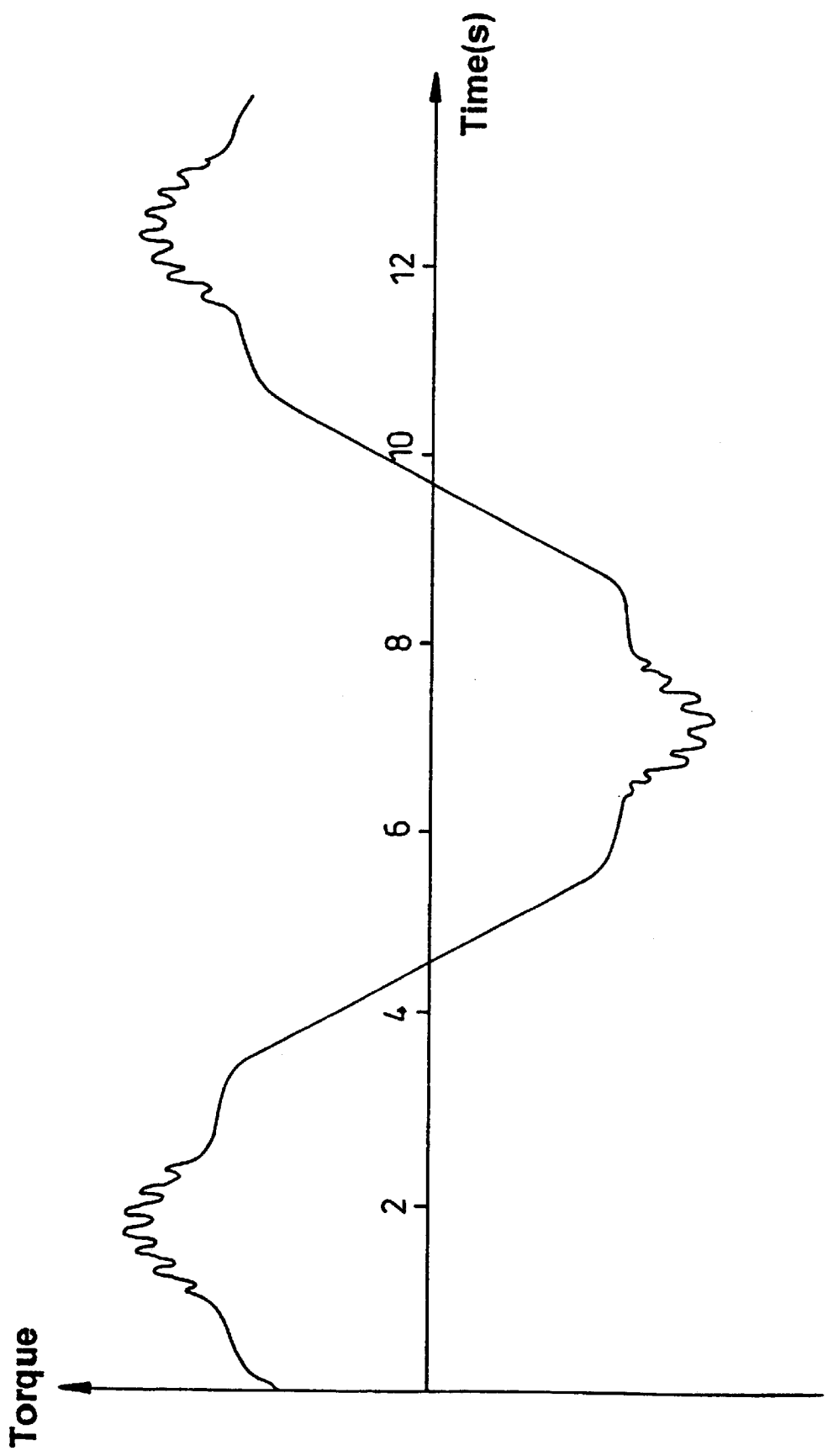
FIG. 4 is a graph showing variation with time of the actuator force in the system of FIG. 1 during cornering.

The result of this characteristic on the system of FIG. 1 during a slalom type manoeuvre is shown in FIG. 4. The slalom manoeuvre comprises a series of turns performed at a constant vehicle speed with each pair of opposite turns taking approximately 11 seconds. As can be seen, as the lateral acceleration increases the levelling torque applied to the actuators 28, 32 is increased steadily according to the characteristic of FIG. 3. Then, when the lateral acceleration reaches 0.7 g the torque pulses start to come in, superimposed on a continuing rise of the mean torque with increasing lateral acceleration. This pulsing causes the front wheels to break away at about the same time as the rear wheels and therefore prevents over-steer at the tightest point of the turn. Then, as the vehicle comes out of the turn and the lateral acceleration falls below 0.7 g, the pulsing ceases and the torque decreases steadily with lateral acceleration.

In this embodiment, because the torque at the front and rear actuators 28, 32, can be controlled independently, assuming that the vehicle has a tendency to over-steer under cornering, the control unit can be arranged to pulse the torque applied to the front actuator only. This will tend to help the front wheels to break away at the same time as the rear ones without simultaneously reducing the grip of the rear wheels.

It is known in roll control systems to use inputs other than lateral acceleration to control the active roll control. For example a combination of road speed and steering angle can be used. In this case, rather than providing a pulse in the actuator. torque above a predetermined lateral acceleration, the control unit would need to be arranged to determine from the steering angle and road speed conditions when over-steer was likely to occur, and provide a pulsed torque in such conditions.

The magnitude and frequency of the pulses will clearly need to be tuned to suit any particular vehicle. Generally increasing the magnitude and decreasing the frequency will tend to promote lateral slipping, but will tend to increase vibration of the vehicle body. If this vibration reaches a level which can be felt by the driver or passengers, an undesirable reduction of ride quality will result. There is therefore a certain degree of compromise between the performance of the system and ride quality.

Figure 5:
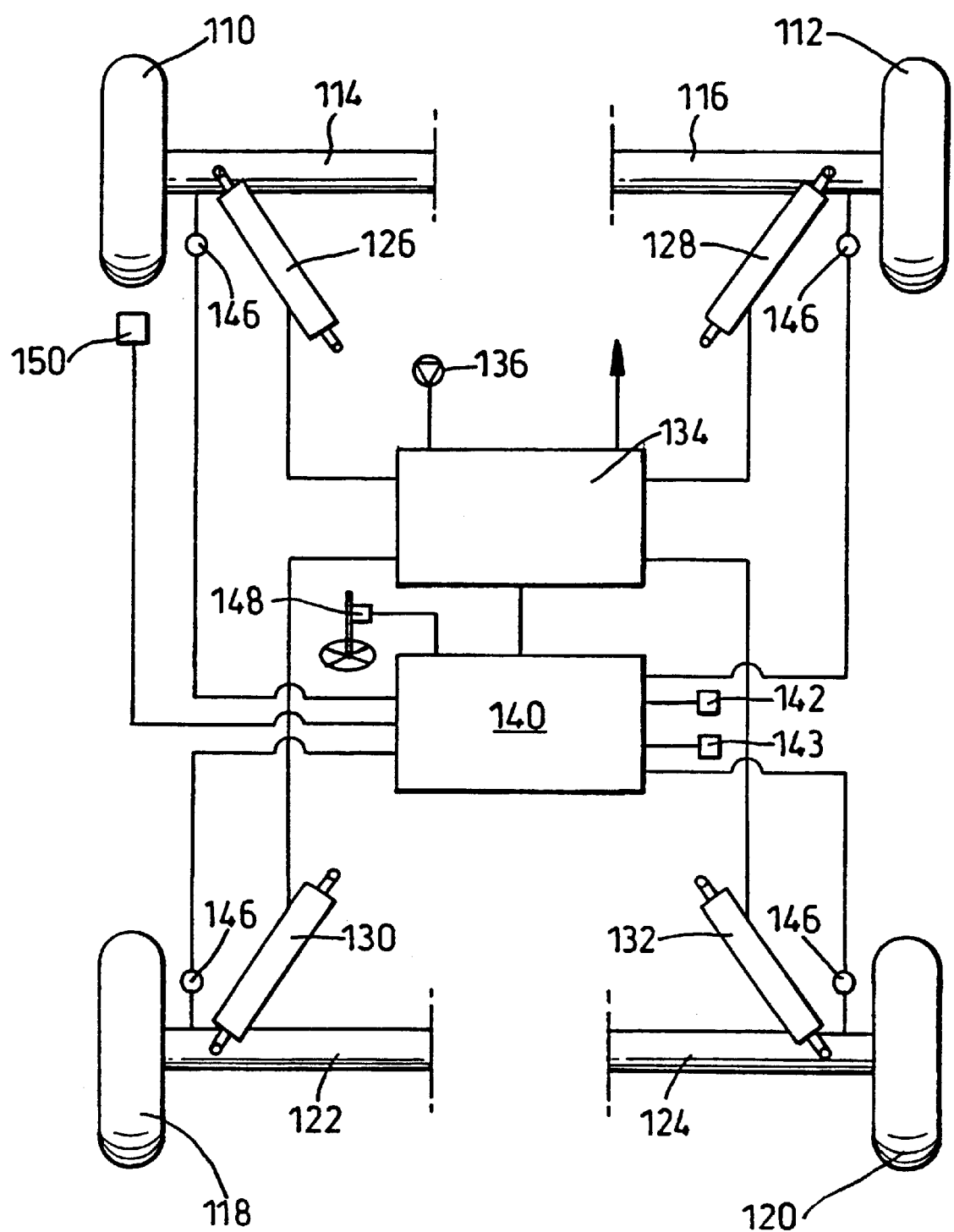
FIG. 5 is a diagrammatic representation of a suspension system according to a third embodiment of the invention.

Referring to FIG. 5, in a third embodiment of the invention a vehicle has a fully active independent air suspension, each of the two front wheels 110, 112 and the two rear wheels 118, 120 being mounted on a suspension arm 114, 116, 122, 124 which pivots about its inboard end. The vertical movement of each wheel is controlled by a gas strut 126, 128, 130, 132, the gas struts being connectable via a valve block 134 to a pneumatic pump 136 and to atmosphere. The valve block 134 is controlled by an electronic control unit 140 which controls the pneumatic pressure supplied to each of the gas struts 126, 128, 130, 132 in response to signals from various sensors. These comprise: a pair of lateral accelerometers 142, 143 which measure the lateral acceleration at different points of the vehicle body, height sensors 146 which measure the height of each of the wheels 110, 112, 118, 120 relative to the vehicle body, a steering angle sensor 148 for measuring the steering angle of the front wheels, and road speed sensors 150, only one of which is shown, which measure the road speed of each of the wheels 110, 112, 118, 120, and hence allow the control unit to determine the road speed of the vehicle.

The control unit 140 includes a map which determines what pressure is supplied to each of the gas struts 126, 128, 130, 132 in response to the full range of possible inputs from the sensors 142, 143, 146, 148, 150. This control includes the usual functions to control pitch and roll of the vehicle and to keep the vehicle level under various loads. However, it also includes a function which allows the pressure supplied to the gas struts 126, 128, 130, 132 to be pulsed when certain conditions are detected. The conditions will vary depending on the characteristics of the vehicle to which the system is applied. However, in this particular embodiment there is a minimum vehicle speed below which no pulsing. will be provided, since under- and over-steer generally do not occur at low speeds. Above the minimum speed, pulsing will be provided to the rear wheels so as to reduce under-steer when the vehicle is cornering so as to produce lateral accelerations above a certain limit, about 0.7 g if the vehicle is similar to that of the second embodiment. This lateral acceleration is measured by the lateral accelerometers 142, 143, and confirmed as being due to cornering by the steering angle sensor 148 and vehicle speed sensor 150. Finally the system is arranged to respond rapidly to conditions which are likely to produce particularly severe over-steer, in particular deceleration of the vehicle during cornering which throws weight forward onto the front, steered wheels and therefore tends to increase over-steer. Therefore if the vehicle speed and steering angle indicate that the vehicle is cornering and the wheel speeds and engine speed, which can also be measured, indicate that the driver has lifted his foot off the accelerator and the vehicle starts to decelerate, pulsing of the pressure to the front gas struts can be introduced rapidly before the body has pitched forwards and the over-steer effects become excessive.

The effect of the system in the third embodiment is essentially the same as in the first and second embodiments, and is to prevent over-steer. However it will be appreciated that, in a vehicle which tends to suffer from under-steer in certain circumstances, it would be possible to use this invention to help overcome the problem by causing vertical vibration of the rear wheels to cause them to break away during cornering. Depending on the characteristics of the vehicle it might be sufficient to vibrate all of the wheels, or it might be necessary to vibrate just the rear wheels.

What is claimed is:

1. A suspension system for connecting a wheel to a sprung part of a vehicle, the wheel being arranged to contact the ground with a contact force which controls a level of adhesion between the wheel and the ground, the system including: a movable part of the suspension system which can move relative to said sprung part thereby to allow vertical travel of the wheel; an actuator arranged to produce an actuator force between said sprung part and said movable part; a cornering sensor arranged to detect predetermined cornering conditions of the vehicle; and a controller, wherein the controller is arranged, in the event of detection of said predetermined cornering conditions, to promote lateral slipping of the wheel by producing a rapid variation in said actuator force so as to produce a pulsing of said contact force causing a reduction in said level of adhesion, so as to control the steering characteristics of the vehicle.

2. A system according to claim 1 for a vehicle having front wheels and rear wheels, wherein the rapid variation is arranged to promote lateral slipping of the front wheels during cornering thereby reducing oversteer.

3. A system according to claim 1 wherein the cornering sensor is arranged to measure lateral acceleration of the vehicle, and the controller is arranged to control the actuator force in response to the measured lateral acceleration.

4. A system according to claim 3 wherein the controller is arranged to produce a rapid change in said actuator force when the measured lateral acceleration reaches a predetermined level such that a change in lateral acceleration of the vehicle produces a rapid change in the actuator force.

5. A system according to claim 1 for a vehicle having steered wheels, the system further comprising a steering angle sensor for measuring the steering angle of the steered wheels, wherein the control of said rapid variation is dependent on the steering angle.

6. A system according to claim 1 further comprising a vehicle speed sensor, wherein the control of said rapid variation is dependent on the vehicle speed.

7. A system according to claim 6 wherein the rapid variation is only produced when the vehicle speed exceeds a predetermined magnitude.

8. A system according to claim 1 further comprising a vehicle deceleration sensor, wherein the rapid variation is produced in response to detected deceleration of the vehicle.

9. A system according to claim 8 for a vehicle having an engine and an engine speed sensor, wherein the engine speed sensor forms the vehicle deceleration sensor.

10. A system according to claim 8 for a vehicle having a driver-operated control input and a sensor for measuring movement of said input, wherein said sensor forms the deceleration sensor.

11. A system according to claim 1 wherein said rapid variation in actuator force comprises a pulsed change.

12. A system according to claim 1 wherein the controller is arranged to produce pulsed variations in the actuator force of a controlled frequency in the event of said predetermined cornering conditions.

13. A system according to claim 1 wherein the actuator comprises a strut arranged to produce forces in a vertical direction between said wheel and said sprung part of the vehicle.

14. A system according to claim 1 for a vehicle having two wheels, wherein the actuator is arranged to urge the two wheels in opposite vertical directions.

15. A system according to claim 14 wherein the actuator is a roll-control actuator, said two wheels being on opposite sides of the vehicle.

16. A system according to claim 15 for a vehicle having opposite ends and wheels at each of said ends, wherein said actuator controls vertical wheel travel of the wheels at one end of the vehicle only.

17. A system according to claim 16 further comprising a second actuator arranged to control vertical movement of the wheels at the other end of the vehicle only, the two actuators being controllable independently.

18. A vehicle including a suspension system according to claim 1.

* * * * *